(12) United States Patent
Kwon et al.

(10) Patent No.: US 8,112,804 B2
(45) Date of Patent: Feb. 7, 2012

(54) MALIGNANT BOT CONFRONTATION METHOD AND ITS SYSTEM

(75) Inventors: Young Kwan Kwon, Seoul (KR); Se Man Oh, Seoul (KR); Sang Youb Lee, Seoul (KR); Gyu Kweon Han, Seoul (KR); Ju Hwan Jeong, Seoul (KR); Seung Tak Oh, Seoul (KR)

(73) Assignee: KT Corporation, Sungnam-si (KR)

( * ) Notice: Subject to any disclaimer, the term of this patent is extended or adjusted under 35 U.S.C. 154(b) by 1034 days.

(21) Appl. No.: 11/971,118

(22) Filed: Jan. 8, 2008

(65) Prior Publication Data

US 2008/0155694 A1    Jun. 26, 2008

Related U.S. Application Data

(63) Continuation of application No. PCT/KR2006/002512, filed on Jun. 28, 2006.

(51) Int. Cl.
*G08B 23/00*    (2006.01)
(52) U.S. Cl. ............... 726/23; 726/22; 726/24; 726/25; 709/244; 709/245; 370/352
(58) Field of Classification Search ............ 726/22–25; 370/352; 709/244, 245
See application file for complete search history.

(56) References Cited

U.S. PATENT DOCUMENTS

| 5,898,830 | A | 4/1999 | Wesinger, Jr. et al. | |
|---|---|---|---|---|
| 6,269,392 | B1 | 7/2001 | Cotichini et al. | |
| 6,300,863 | B1 | 10/2001 | Cotkchini et al. | |
| 7,152,118 | B2 * | 12/2006 | Anderson et al. | 709/245 |
| 2002/0184528 | A1 | 12/2002 | Shevenell et al. | |
| 2005/0027882 | A1 * | 2/2005 | Sullivan et al. | 709/244 |
| 2005/0105513 | A1 * | 5/2005 | Sullivan et al. | 370/352 |
| 2005/0259645 | A1 * | 11/2005 | Chen et al. | 370/389 |

FOREIGN PATENT DOCUMENTS

| JP | 2004-072453 A | 3/2004 |
|---|---|---|
| WO | 02/23805 A2 | 3/2002 |

OTHER PUBLICATIONS

Miyoung Kim et al, "Design and Implementation of the HoneyPot System with Focusing on the Session Redirection", Computational Science and its Applications, A ICCSA 2004, vol. 3043, Apr. 23, 2004, pp. 262-269, XP019006767.
European Search Report of Corresponding European Patent Application No. 06769087.5-2211 dated Mar. 20, 2009, 6 pages.

* cited by examiner

*Primary Examiner* — Thanhnga Truong
(74) *Attorney, Agent, or Firm* — Knobbe Martens Olson & Bear LLP

(57) ABSTRACT

A method for dealing with attacks of malicious BOTs in a network security system includes detecting and analyzing a domain name receiving excessive DNS queries to judge the infection of a malicious BOT, registering the corresponding domain name as normal or abnormal management target, and redirecting an abnormal DNS query for the abnormal management target to a redirection processing & response system. Thereby, the automatic detection of malicious BOT attacks and the mechanism which performs the measures and the analysis simultaneously can protect the DNS servers and prevent the security accidents by malicious BOT attacks previously.

5 Claims, 4 Drawing Sheets

MALIGNANT BOT CONFRONTATION METHOD AND ITS SYSTEM

CROSS-REFERENCE TO RELATED APPLICATIONS

This application is a continuation application under 35 U.S.C. §365(c) of International Application No. PCT/KR2006/002512, filed Jun. 28, 2006 designating the United States. International Application No. PCT/KR2006/002512 was published in English as WO2007/007960 A1 on Jan. 18, 2007. This application further claims the benefit of the earlier filing dates under 35 U.S.C. §365(b) of Korean Patent Application No. 10-2005-0061559 filed Jul. 8, 2005. This application incorporates herein by reference the International Application No. PCT/KR2006/002512 including the International Publication No. WO2007/007960 A1 and the Korean Patent Application No. 10-2005-0061559 in their entirety.

BACKGROUND

1. Field

The present invention generally relates to a malicious BOT measures method and its system.

2. Related Technology

A BOT refers to one of software for performing or controlling a predetermined operation by a specific event or a specific command as a script code having various functions including a remote function for specific objects. Moreover, a malicious BOT refers to a BOT for performing a malicious operation by a malicious user to intrude other computers or systems, thereby causing damages. The malicious BOT intrudes computers or systems which are in poor security to execute commands onto these systems, attacks other computers or systems, or discloses information from the compromised systems.

When the malicious BOT attacks a specific network or system, it generates more data than the capacity of the target network or system so as to disable the normal service.

The malicious BOT performs a DNS query for an IP address of a target system to a DNS server so as to obtain the IP address of the target system. An excessive traffic generated from the computer infected by the malicious BOT may cause damages to the network as well as the target system. In order to prevent these damages, a contents filtering system has been recently used.

When the computer or system infected by malicious BOT performs a DNS query so as to obtain an IP address, the contents filtering system checks out the contents of the query. The contents filtering system checks out the contents to generate a DNS query blocking rule set, and deals with malicious BOTs by dropping the DNS query from the malicious BOTs.

But there is a problem that the source station generating an abnormal DNS query can repeatedly generate the same query, because the contents filtering system drops the abnormal DNS queries. The re-generation of queries causes heavy traffic so that the service is disabled by overload of network equipments.

SUMMARY

Various embodiments of the present invention are directed at detecting the excessive DNS queries generated by compromised computers or systems through malicious BOT, analyzing these queries, registering the abnormal domain name as a management target, and redirecting the abnormal DNS query registered as a management target to protect the DNS servers and prevent the security accidents by malicious BOT attacks previously.

According to an embodiment of the present invention, a malicious BOT measures method comprises the steps of detecting the excessive DNS queries generated by compromised personal computers through malicious BOT, analyzing these queries to classify into normal or abnormal management target, registering the abnormal domain name as a management target, forwarding the normal DNS queries to DNS servers and redirecting the abnormal DNS query registered as a management target to a redirection processing & response system.

According to an embodiment of the present invention, a malicious BOT measures system comprises a redirection processing system for analyzing these queries to classify into normal or abnormal management target, registering the domain name as normal or abnormal management target and redirecting the abnormal DNS query registered as a management target to a redirection processing & response system, and a redirection processing & response system for generating a response to the abnormal DNS query.

DETAILED DESCRIPTION OF EMBODIMENTS

The present invention will be explained with reference to the attached drawings.

Figure 1:
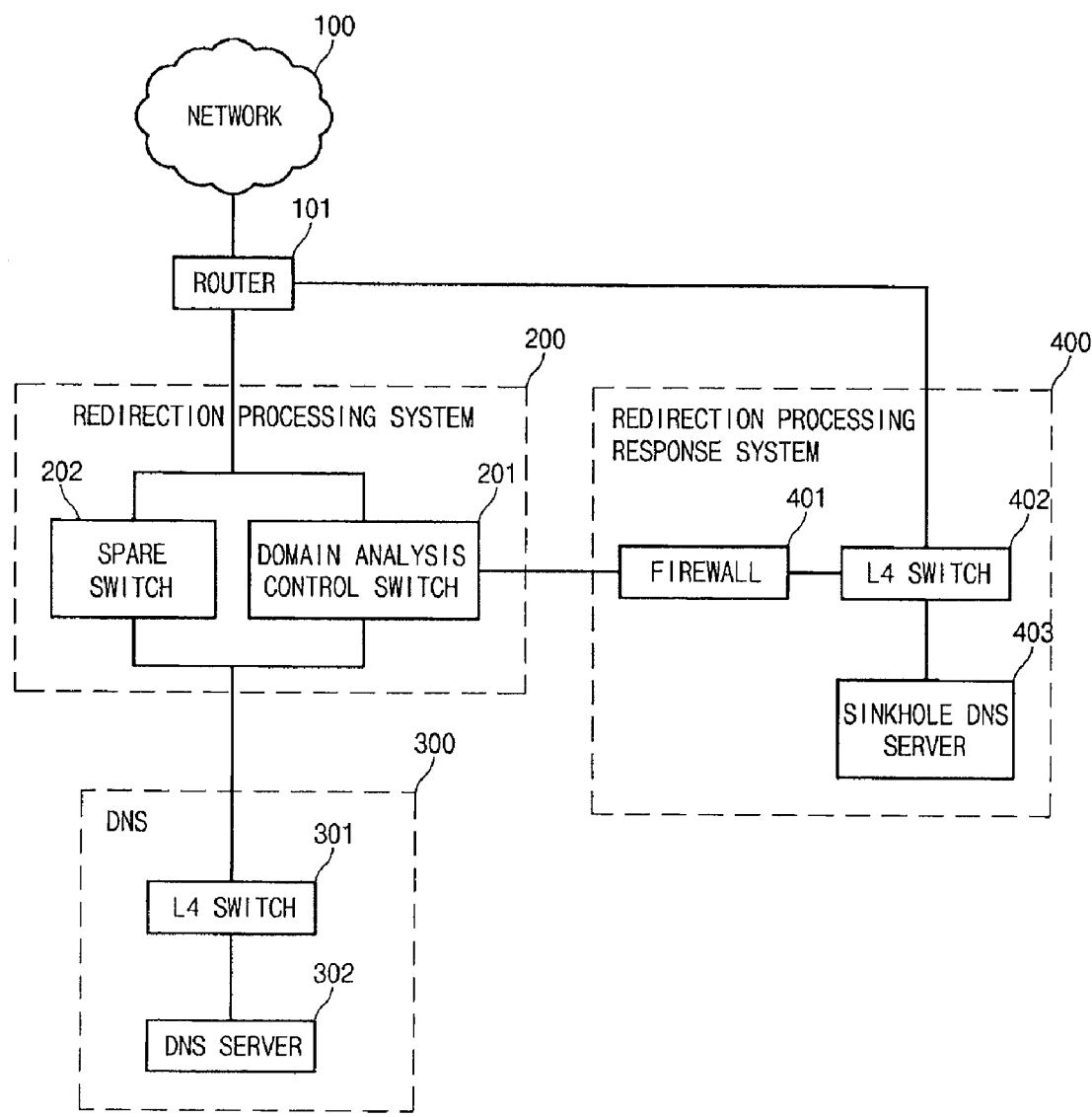
FIG. 1 is a diagram illustrating a malicious BOT measures system according to an embodiment of the present invention.

FIG. 1 is a diagram illustrating a malicious BOT measures system according to an embodiment of the present invention.

In this embodiment, a malicious BOT measures system includes a router 101, a redirection processing system 200, a DNS 300, a redirection processing & response system 400 and a honey pot system (not shown).

The router 101 transmits the traffic of a network 100 toward the DNS 300 to the redirection processing system 200.

The redirection processing system 200 includes a Domain Analysis & Redirection (hereinafter, referred to as "DAD") 201 and a spare switch 202.

The DAD 201 of the redirection processing system 200 analyzes the traffic approaching DNS 300 to redirect an abnormal DNS query.

The DAD 201 as a switch based on layer 4 and/or layer 7 detects excessive DNS query traffic, and checks out which domain name generates the excessive DNS queries. Then, the DAD 201 registers the domain name which generates the excessive DNS queries as normal or abnormal management target list to redirect the DNS query for the domain name registered in the abnormal management target list. Thereafter, the DAD 201 changes the destination address of a DNS query which is determined to be redirected with the address of the redirection processing & response system 400. Then the abnormal DNS query whose destination address has been changed is routed from the DAD 201 to the redirection processing & response system 400 because its destination address is not the DNS 300 but the redirection processing & response system 400. If the DNS query is a domain name registered in the normal management target, the DAD 201 routes the DNS query to the DNS 300.

The spare switch 202 performs the same function as the DAD 201, and it is a redundant device of the DAD 201 for emergency such as troubles of the DAD 201.

When an IP address of a domain name is queried, the DNS 300 for storing an IP address of a domain name transmits an IP address corresponding to the queried domain name as a response. Embodiments of the DNS 300 can be various.

In this embodiment, an example of the DNS 300 consists of a L4 switch 301 and DNS servers 302.

The DNS server 302 is required to have IP addresses of all domain names. However, it is difficult to store IP addresses of all domain names in one server. That is, the DNS 300 consists of several DNS servers 302 because of service speed and storage limit. As each system of DNS servers 302 has a different address, there will be somewhat confusion on accessing the DNS 300.

The L4 switch 301 has a Virtual Internet Protocol (hereinafter, referred to as "VIP") address of the DNS 300, receives a DNS query from the redirection processing system 200, and transmits the DNS query to the DNS server 302. The L4 switch 301 has a VIP address of the DNS 300 so that a user in the network 100 uses the VIP address when DNS query. The query using the VIP address is routed to the L4 switch 301, and then transmitted from the L4 switch 301 to the corresponding DNS server 302.

The redirection processing & response system 400 deals with the abnormal DNS query by response strategy which is set by a network administrator.

The redirection processing & response system 400 includes a firewall 401, a sinkhole L4 switch 402 and sinkhole DNS servers 403.

The firewall 401 converts the destination address of a abnormal DNS query routed from the redirection processing system 200 into that of the sinkhole L4 switch 402 using NAT (Network Address Translation) function.

The sinkhole DNS server 403 of the redirection processing & response system 400 is a kind of DNS server. Thus, the sinkhole L4 switch 402 is required in the sinkhole DNS server 403. The sinkhole L4 switch 402 of the redirection processing & response system 400 has the same VIP address as that of the DNS(300). When a source station which generated an abnormal DNS query receives a response, it checks out a source IP address of the response to identify whether the response is corresponding to the query generated by the source station itself. If the source address is different, the response does not relationship to the request of the source station so that the source station drops this response. As a result, in order to the sinkhole L4 switch 402 has the same address as that of the DNS 300, the firewall 402 converts the destination address of the query into the VIP address of the sinkhole L4 switch 402.

The sinkhole L4 switch 402 transmits the response generated from the sinkhole DNS servers 403 to the router 101. This path, as a one-way static path to the router 101, prevents the DNS query from being transferred to the redirection processing & response system 400 without analysis of the redirection processing system 200 in the router 101.

The sinkhole DNS servers 403 generates a response to the abnormal DNS query. The response of the sinkhole DNS server 403 is different from the normal response generated from the DNS 300. The response generated from the sinkhole DNS servers 403 is to deal with malicious BOTs.

The honey pot system (not shown) is for the intrusion temptation of malicious BOTs and the analysis of the characteristics of BOTs. The redirection processing & response system 400 and the honey pot system (not shown) can be located at the same place or different places through the internet network.

Figure 2:
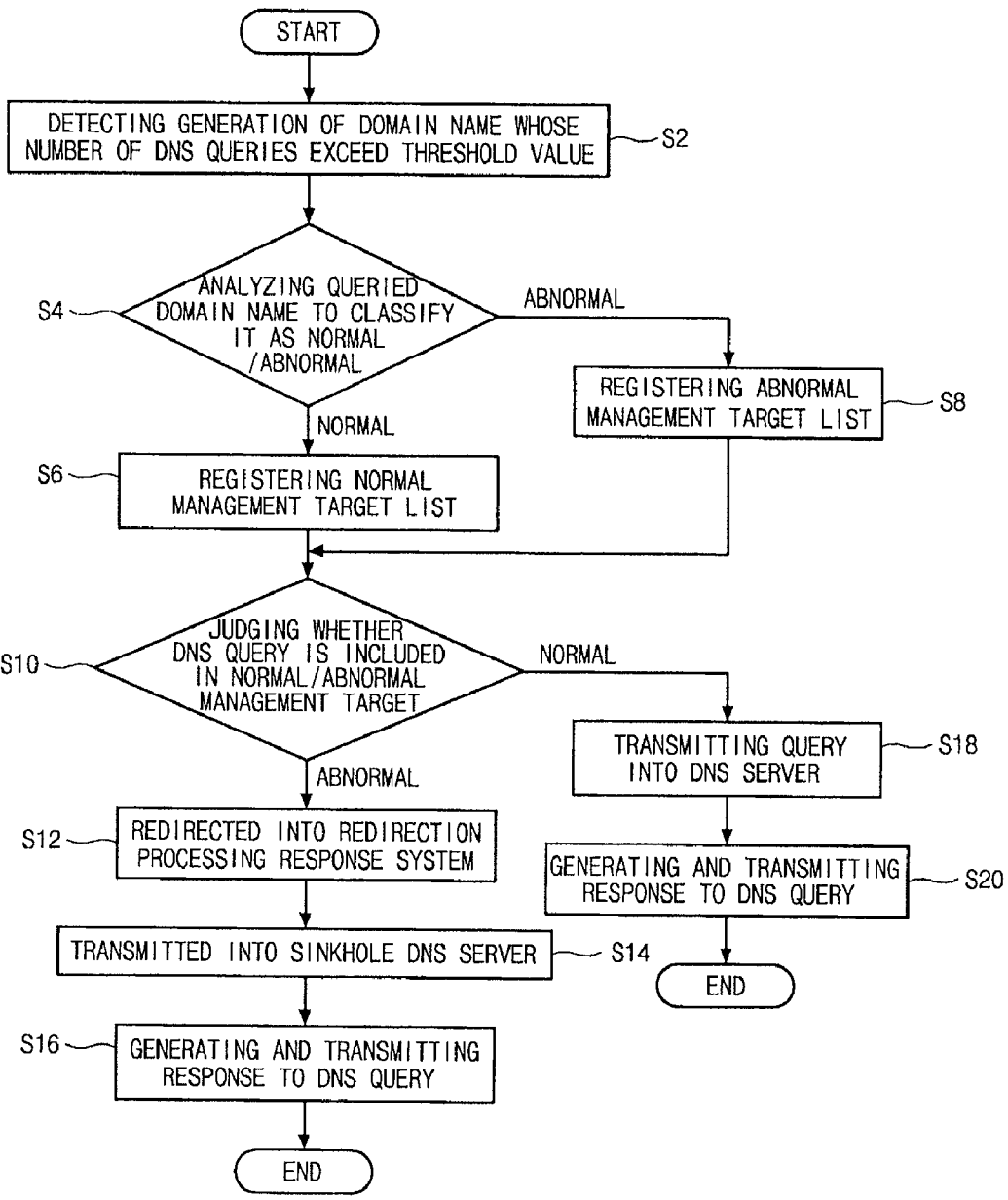
FIG. 2 is a flow chart illustrating a malicious BOT measures method according to an embodiment of the present invention.

FIG. 2 is a flow chart illustrating a malicious BOT measures method according to an embodiment of the present invention.

The redirection processing system 200 detects exceed queries over the threshold-value among DNS queries received through the router 101 (S2). The redirection processing system 200, which is located between the network 100 and the DNS 300, calculates the number of DNS queries for a specific domain name so as to decide whether it is over a predetermined number set by a network administrator or an administering system, and then detects a domain name exceeding a threshold value.

The redirection processing system 200 analyzes and identifies the domain name exceeding the threshold value to classify into normal or abnormal management target (S4). The switch based on layer 4 and/or layer 7 can perform other functions except deciding the optimum path. This kind of switch is able to distinguish the DNS service types of queries using the port information of TCP/UDP (Transmission Control Protocol/User Datagram Protocol) of the switch. Especially, the function based on the layer 7 can provide more information such as contents pattern of traffic. A network administrator judges with this information whether the domain name is normal or not.

As for the analysis result of the step S4, in case of the domain name classified as normal, the redirection processing system 200 registers the domain name in a normal management target list of the redirection processing system 200 (S6).

On the other hand, in case of the domain name classified as abnormal, the redirection processing system 200 registers the domain name in an abnormal management target list of the redirection processing system 200 (S8).

As the redirection processing system 200 registers each domain name in the normal or abnormal management target list (S6 or S8), the redirection processing system 200 can distinguish between the normality and the abnormality of the following DNS queries (S10).

In the step S10, when the redirection processing system 200 judges a DNS query as abnormal, the redirection processing system 200 redirects the DNS query to the redirection processing & response system 400 (S12). The redirection processing system 200 changes a destination address of the DNS query into an address of the firewall 401 of the redirection processing & response system 400 with Network Address Translation (hereinafter, referred to as "NAT"). The DNS query whose destination address has been changed can be redirected not into the DNS 300 but into the redirection processing & response system 400, because the destination address of the DNS query is not for the DNS 300 but for the firewall 401 of the redirection processing & response system 400.

The query whose destination address has been changed into the destination address of the redirection processing system 200 is transmitted to the firewall 401 of the redirection processing & response system 400 (S14). The DNS 300 has the same VIP address as that of the redirection processing & response system 400. The destination address of the redirected DNS query is changed into the sinkhole DNS server 403 by the NAT in the firewall 401 of the redirection processing & response system 400. The query whose destination address has been changed by the NAT is transmitted to the sinkhole DNS server 403, which generates a response to the query (S16). However, the sinkhole DNS server 403 generates a different response from that of DNS server 302. The DNS query transmitted to the sinkhole DNS server 403 as an abnormal query may cause damage to a specific network or system. In order to prevent this damage, the sinkhole DNS server 403 responses to the DNS query with a loop-back address (127.0.0.1) or an IP address of the honey pot system (not shown). The loop-back address can contain the traffic generated by malicious BOT within its compromised system or computer. The honey pot system (not shown) for the intrusion temptation and the analysis of the characteristics of malicious BOTs reduces damages of other systems or networks by inducing the intrusions of malicious BOTs into this system and seeks countermeasures of malicious BOTs through characteristic analysis.

The response generated from the sinkhole DNS server 403 is transmitted through the sinkhole L4 switch 402 and the router 101 (S16) to the source station which is compromised PC by malicious BOT. Since the sinkhole DNS server 403 has the same VIP address as that of the DNS server 302, the response generated from the sinkhole DNS server 403 has the same source IP address as that of the response generated from the DNS servers 302. If the source IP addresses are different, the source station which is compromised PC by malicious BOT judges that the response is not corresponding to its request, and then drops the response. Therefore, the source IP addresses should be the same as that of DNS servers.

In the step S10, when the redirection processing system 200 judges that the DNS query is normal, the redirection processing system 200 transmits the DNS query to the DNS 300 (S18).

The DNS server 302 looks up an IP address which is related to the domain name requested in the DNS query to generate a response to the DNS query. The generated response is transmitted to the router 101 through the L4 switch 301 and the redirection processing system 200, and then transmitted from the router 101 to the source station (S20).

Figure 3:
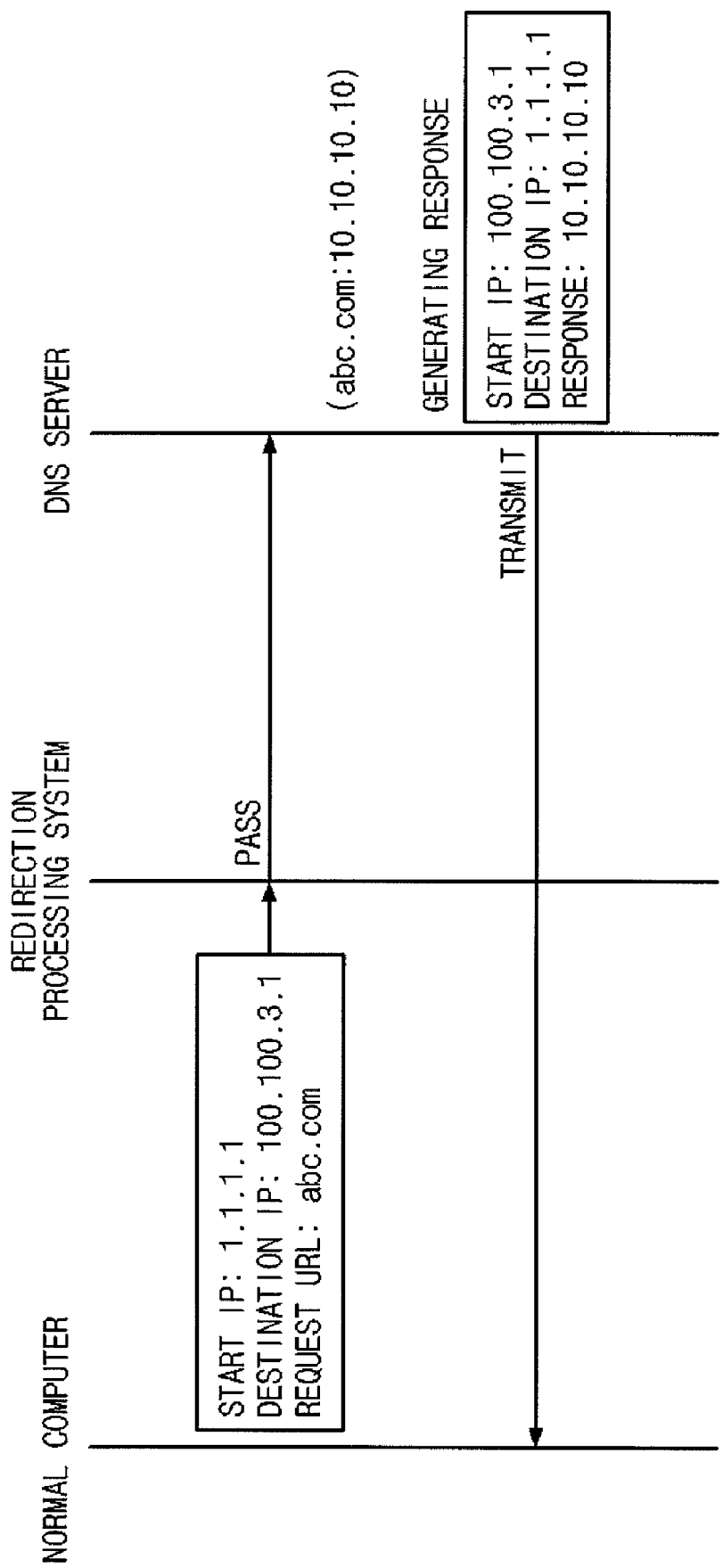
FIG. 3 is a flow chart illustrating a normal DNS query request/response according to an embodiment of the present invention.

FIG. 3 is a flow chart illustrating a normal DNS query request/response according to an embodiment of the present invention.

In order for the source station which is not compromised PC by malicious BOT, having an IP address (1.1.1.1), to obtain an IP address of a domain name (abc.com), it transmits the DNS query to the DNS 300 having an IP address (100.100.3.1). When the query is normal, the redirection processing system 200 passes that query to the DNS 300. The DNS 300 that received the DNS query looks up an IP address (10.10.1.1) of the domain name (abc.com) requested in the received DNS query, and then responds with the destination IP address (1.1.1.1).

Figure 4:
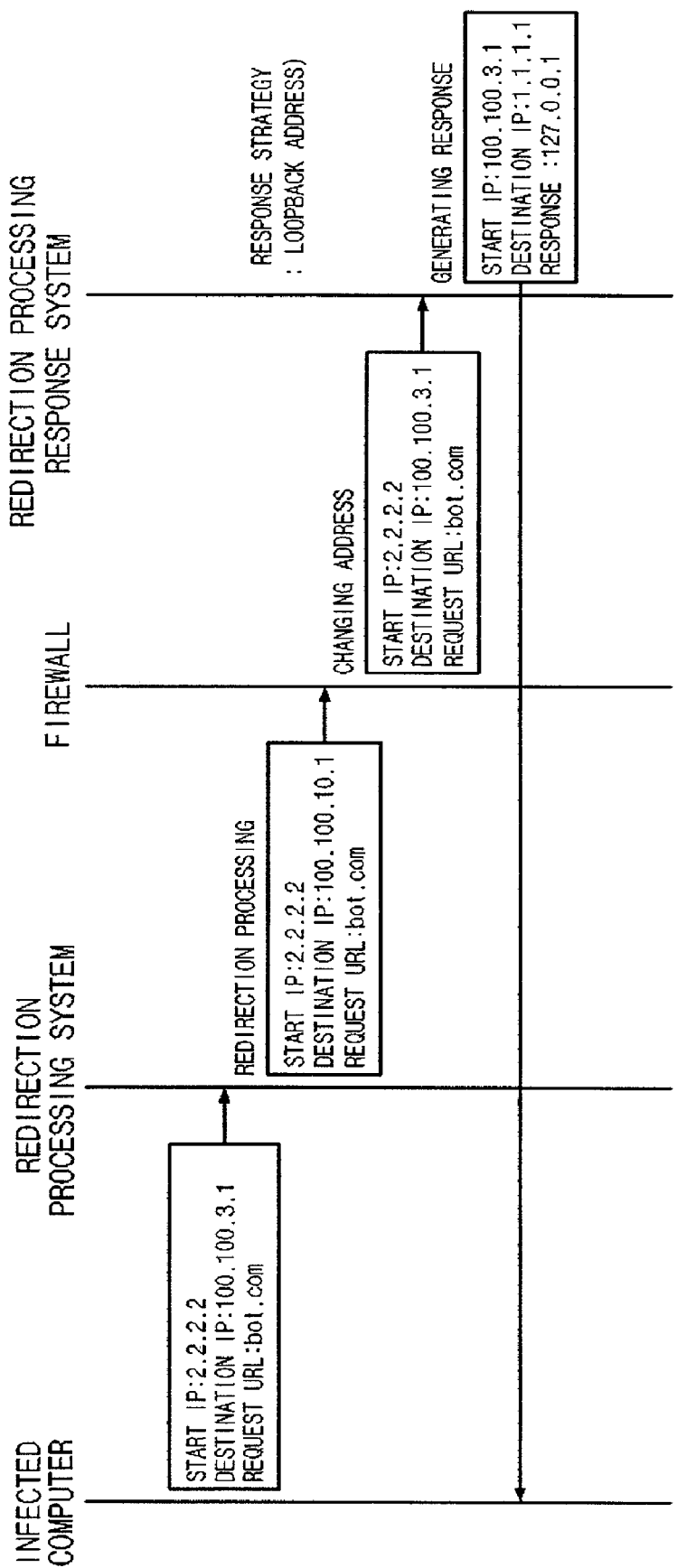
FIG. 4 is a flow chart illustrating an abnormal DNS query request/response according to an embodiment of the present invention.

FIG. 4 is a flow chart illustrating an abnormal DNS query request/response according to an embodiment of the present invention.

When a compromised computer or system by malicious BOT, having an IP address (2.2.2.2), requests an abnormal DNS query, the redirection processing system 200 changes a destination address of the abnormal DNS query into a firewall address (100.100.10.1) of the redirection processing & response system 400 to transmit the abnormal query to the firewall 401. The firewall 401 changes the destination address into the IP address of a sinkhole DNS server 403 to transmit the abnormal DNS query to the sinkhole DNS servers 403. The sinkhole DNS server replies with a loop-back address (127.0.0.1) or an address of honey pot system depending on the configuration set by an administrator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The embodiment of the present invention can be applied to a network security system.

What is claimed is:

1. A malicious BOT measures method comprising the steps of: detecting excessive Domain Name System (DNS) queries generated by compromised PC through malicious BOT; analyzing these queries to classify into normal or abnormal management target; and redirecting the abnormal DNS query registered as a management target to a redirection processing & response system, wherein the redirecting step includes the steps of: changing a destination address of the abnormal DNS query, into the redirection processing & response system; generating a response to the abnormal DNS query in the redirection processing & response system: and transmitting the response to the compromised PC by malicious BOT, wherein the response generated from the generating step has one of a loop-back address preset by a network administrator and an address of honey pot system for the intrusion temptation and the analysis of malicious BOT characteristics.

2. The malicious BOT measures method according to claim 1, wherein the detecting step includes collecting DNS query packets to detect whether the amount of the queries about specific domain name exceeds a preset threshold value.

3. The malicious BOT measures method according to claim 1, wherein the response generated from the generating step has the same source IP address as that of a response to the normal DNS query.

4. A malicious BOT measures system comprising: a redirection processing system for analyzing and identifying a domain name to receive receiving excessive Domain Name System (DNS) queries, registering the domain name as normal or abnormal management target and redirecting the abnormal DNS query for a domain name registered as the abnormal management target to a redirection processing & response system; and the redirection processing & response system for generating a response to the abnormal DNS query, wherein the redirection processing system changes the destination address of an abnormal DNS query into the address of the redirection processing & response system to redirect the abnormal DNS query, and wherein the redirection processing & response system generates the response to the abnormal DNS query which has a loop-back address or an address of honey pot system for the intrusion temptation and the analysis of malicious BOT characteristics depending on the configuration set by an administrator.

5. The malicious BOT measures system according to claim 4, wherein the redirection processing & response system generates the response to the abnormal DNS query which has the same IP address as that of a response to a normal DNS query.

* * * * *